United States Patent [19]
Marrs et al.

[11] Patent Number: 5,504,476
[45] Date of Patent: Apr. 2, 1996

[54] METHOD AND APPARATUS FOR GENERATING ALERTS BASED UPON CONTENT OF MESSAGES RECEIVED BY A RADIO RECEIVER

[75] Inventors: Michael R. Marrs, Parkland; Robert D. Lloyd, Boca Raton; Gerald R. King, Ft. Lauderdale, all of Fla.

[73] Assignee: Motorola, Inc., Schaumburg, Ill.

[21] Appl. No.: 282,112

[22] Filed: Jul. 28, 1994

[51] Int. Cl.⁶ .............................. G08B 5/22; H04Q 7/00
[52] U.S. Cl. ................. 340/825.44; 340/825.47; 340/311.1; 455/38.2
[58] Field of Search ............. 340/825.44, 825.45, 340/825.46, 825.47, 825.48, 311.1; 455/38.2, 38.4, 38.5; 379/57

[56] References Cited

U.S. PATENT DOCUMENTS

| | | | |
|---|---|---|---|
| H1,173 | 4/1993 | Davis et al. | 340/825.44 |
| 4,758,834 | 7/1988 | Sato et al. | 340/825.47 |
| 4,868,561 | 9/1989 | Davis | 340/825.44 |
| 4,922,221 | 5/1990 | Sato et al. | 340/825.47 |
| 4,975,693 | 12/1990 | Davis et al. | 340/825.45 |
| 4,994,797 | 2/1991 | Breeden | 340/825.44 |
| 5,043,721 | 8/1991 | May | 340/825.44 |
| 5,122,778 | 6/1992 | Erhart et al. | |
| 5,221,923 | 6/1993 | Tsunoda et al. | 455/38.2 |
| 5,287,099 | 2/1994 | Tsunoda | 340/825.44 |
| 5,307,059 | 4/1994 | Connary et al. | 340/825.44 |
| 5,317,621 | 5/1994 | Shibayama | 340/825.44 |

Primary Examiner—Donald J. Yusko
Assistant Examiner—Edward Merz
Attorney, Agent, or Firm—Kelly A. Gardner

[57] ABSTRACT

A communication system (100) for alerting a user based upon content of messages transmitted to the user includes a terminal (105) for generating and transmitting a message having first and second recipient identifications (IDs) and first and second alert codes. A radio receiver (110) receives the message and determines whether the first recipient ID is equivalent to an ID associated with the radio receiver (110). When the first recipient ID is equivalent to an ID associated with the radio receiver (110), the radio receiver (110) selects one of the at least first and second alert codes based upon a location of the first recipient ID within the message and generates an alert associated with the one of the at least first and second alert codes.

24 Claims, 6 Drawing Sheets

METHOD AND APPARATUS FOR GENERATING ALERTS BASED UPON CONTENT OF MESSAGES RECEIVED BY A RADIO RECEIVER

FIELD OF THE INVENTION

This invention relates in general to radio receivers having alerts, and more specifically to a radio receiver for generating an alert based upon message content.

BACKGROUND OF THE INVENTION

Portable radio receivers, such as pagers, are typically carried by users for the purpose of receiving messages when away from a computer or telephone. Generally, a portable receiver includes an alert mechanism for generating an alert to announce reception of a message to the user. In response to receiving the message, the receiver may then display the message to the user automatically, or the message may be displayed in response to manipulation of controls by the user. In some situations, the user could be inconvenienced by having to read the message immediately in order to determine its content. Therefore, some portable receivers generate different alerts to announce reception of different types of messages such that the user can determine the message type from hearing the alert.

In many communication systems, common messages are often transmitted to multiple portable receivers. Some communication systems, for instance, transmit sports information to service subscribers who carry portable receivers so that the subscribers can receive current information about a sport or even a particular event. Using conventional paging technology, a portable receiver carried by such a subscriber could, for example, be alerted to the message type, e.g., "sports", of the received message. Although the user could determine the message type from the alert, he could not, however, determine message content from the alert. As a result, the user would have to read each received message to determine whether the current message was of interest to him.

Thus, what is needed is a method and apparatus for generating alerts based upon message content.

SUMMARY OF THE INVENTION

A method, in a radio receiver, for generating alerts based upon message content including the step of receiving a common message comprising at least first and second recipient identifications (IDs) and at least first and second alert codes, wherein the common message is received by other system receivers having addresses equivalent to an address associated with the radio receiver, and wherein the at least first and second recipient IDs and the at least first and second alert codes are separate and distinct from the address. The method further includes the steps of determining which of the at least first and second recipient IDs included in the common message is a recipient ID associated with the radio receiver and selecting one of the at least first and second alert codes indicated by the recipient ID associated with the radio receiver, wherein the one of the at least first and second alert codes selected by the radio receiver can be different from an alert code, included in the at least first and second alert codes, that is selected by others of the other system receivers. An alert associated with the one of the at least first and second alert codes is then generated.

A radio receiver for generating alerts based upon content of received messages includes a receiving circuit for receiving an address and a message common to all system receivers. The address indicates that the message is intended for reception by the system receivers, and the message includes at least first and second alert codes that are separate and distinct from the address and that are each indicative of an alert pattern. The message further includes at least first and second recipient identifications (IDs) that are separate and distinct from the address and that direct each of the system receivers to one of the at least first and second alert codes within the message. An ID locator element is included in the radio receiver for monitoring, after determining from the address that the message is intended for reception by the radio receiver, the message to determine whether an ID associated with the radio receiver is equivalent to one of the at least first and second recipient IDs. When the ID associated with the radio receiver is equivalent to one of the at least first and second recipient IDs, the ID locator element determines a location of the one of the at least first and second recipient IDs within the message. An alert code locator element coupled to the ID locator element utilizes the location of the one of the at least first and second recipient IDs to look up a location associated with one of the at least first and second alert codes provided in the message, and a sound locator element coupled to the alert code locator element utilizes the one of the at least first and second alert codes to look up alert information associated therewith.

DESCRIPTION OF A PREFERRED EMBODIMENT

Figure 1:
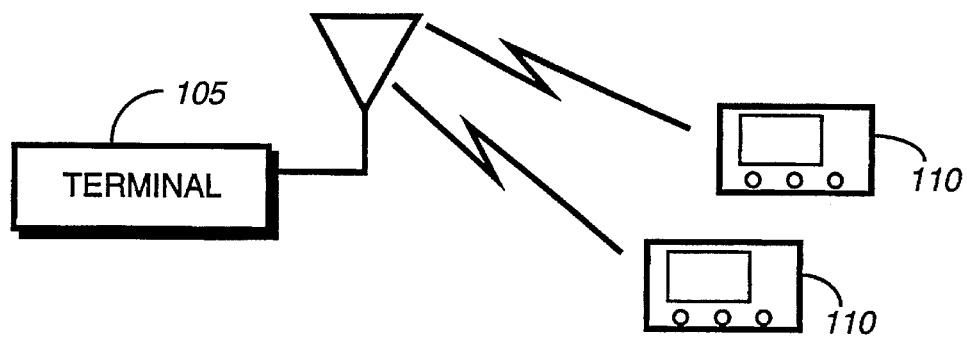
FIG. 1 is an electrical block diagram of a communication system in accordance with the present invention.

FIG. 1 is an electrical block diagram of a communication system 100 comprising a terminal 105 for transmitting messages to a plurality of radio receivers 110, such as portable pagers or transceivers, over the air. The messages received by the radio receivers 110 preferably include message information for display to the user in addition to alert codes from which a receiver 110 can determine which of several predetermined alerts should be generated to announce reception of the message.

According to the present invention, the radio receivers 110 receive common messages about events, such as sports events, on the same paging address. By way of example, when the radio receivers 110 are to receive information about baseball or football, each radio receiver 110 is associated with a particular sports team by means of a stored recipient identification (ID) indicative of that team. A radio receiver 110 preferably receives a sports message and scans the message to determine whether or not its "team ID" is included in that message to indicate that the message is of interest to the user. It will be appreciated that, when the communication system 100 provides information messages of other types, the receiver 110 would scan a received message to locate another type of unit ID. In sports-specific situations, when the team ID associated with the radio receiver 110 is included in the message, the radio receiver 110 proceeds to locate an alert code included within the message to determine which of the predetermined alerts is to be generated. When, for instance, the message information indicates that the sports team associated with the receiver 110 has scored a run or a touchdown, an alert code within the message can prompt the receiver 110 to generate a "cheer" or "yea" noise to inform the user of a favorable occurrence. As mentioned, the same message is provided to all of the receivers 110. When the same message is received by a receiver 110 associated with the opposing team, a different alert code within the message can result in the generation of a "boo", "sigh", or other unfavorable noise by that receiver 110.

In this manner, a common message can be sent to different groups of receivers 110, and each group can conveniently extract different sets of data from the common message based upon a subaddress, e.g., the recipient IDs. Additionally, the common message can include common data that is intended for reception by all of the different groups of receivers 110. Therefore, a single transmitted message can conveniently include common data for reception by all of the receivers 110 and at least two different sets of data, each intended for reception by a different receiver group. Conventionally, in order to provide different information to two different paging groups, two different messages, each sent with a unique paging address, are transmitted over the air. As a result, in a conventional sports service context, each group of pagers associated with a different sports team would have a unique address. Messages conventionally transmitted to home team pagers would include the home team address and message information, e.g., alert code, intended therefor, and separate messages transmitted to visitor team pagers would include the visitor team address and the message information intended for reception by the visitor team pagers. According to the present invention, however, only half as many messages are required be transmitted because the receivers 110 for each different group can advantageously determine from the common message which of the information is intended for reception and which is not and can further recover common information intended for all receivers 110. As a result, paging channels are utilized more efficiently in the communication system 100.

Figure 2:
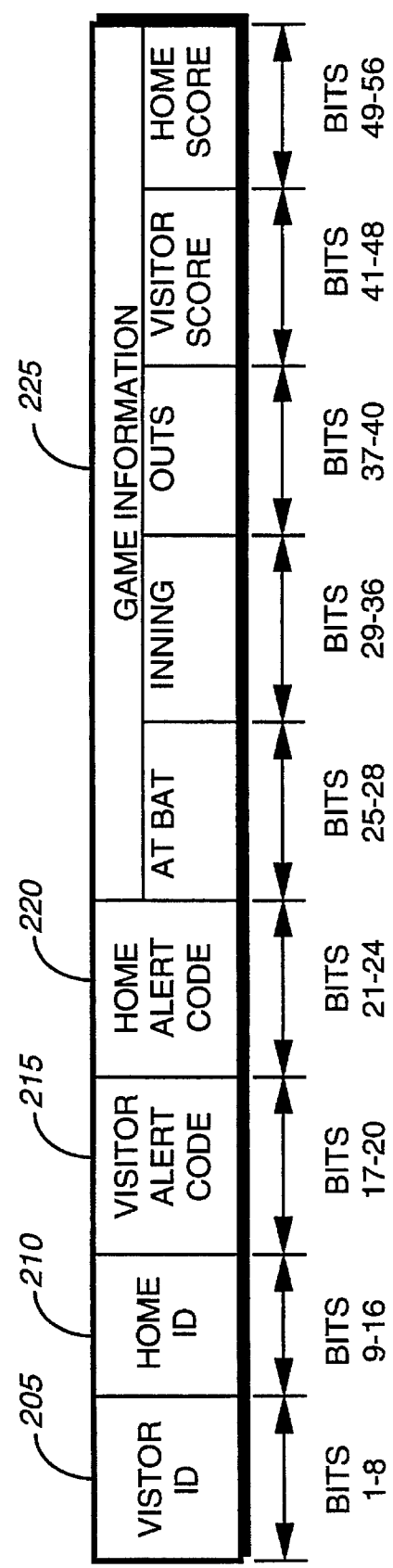
FIG. 2 is a signal diagram of a message transmitted by a terminal included within the communication system of FIG. 1 to a radio receiver included within the communication system of FIG. 1 in accordance with the present invention.

FIG. 2 illustrates an example of a message that can be transmitted from the terminal 105 to the receivers 110 to update users of the receivers 110 on a particular sporting event, such as baseball. Preferably, the message comprises recipient, or team, IDs 205, 210 located in predetermined locations within the message to indicate which two baseball teams are currently playing a baseball game that is the subject of the message. The team IDs 205, 210 can, for example, each consume eight bits of the message. According to the present invention, the team IDs 205, 210 indicate by their locations which of the two teams is the home team and which of the two teams is the visitor team. In this example, the ID 205 for the visitor team is included first in the message and is followed by the home team ID 210. The message further comprises a visitor alert code 215 and a home alert code 220, each located in different predetermined locations. Additionally, the message can include game information 225 to inform the user of the current game status. Such game information 225 can, for example, include details about which team is at bat, the inning of the game, the number of outs for the team at bat, and the score of the game.

In accordance with the present invention, a radio receiver 110 associated with one of the team IDs 205, 210 can determine, from the location of its ID within the message, whether its team is the home team or the visitor team. Thereafter, the radio receiver 110 can advantageously determine the location of the appropriate alert code within the message such that an alert is generated to indicate whether the latest game event is favorable or unfavorable to the team associated with the receiver 110.

It will be appreciated that the message of FIG. 2 is depicted for example purposes only and that the placement of the team IDs 205, 210 and the alert codes 215, 220 can vary as long as the placement is predetermined and recognizable by the receiver 110. It will be further appreciated that the number of team IDs and alert codes can vary depending upon the sport with which the radio receiver 110 is associated. If, for example, information about a horse race is to be transmitted to the receivers 110, the number of team IDs and alert codes would be equal to the number of entries in the race.

Figure 3:
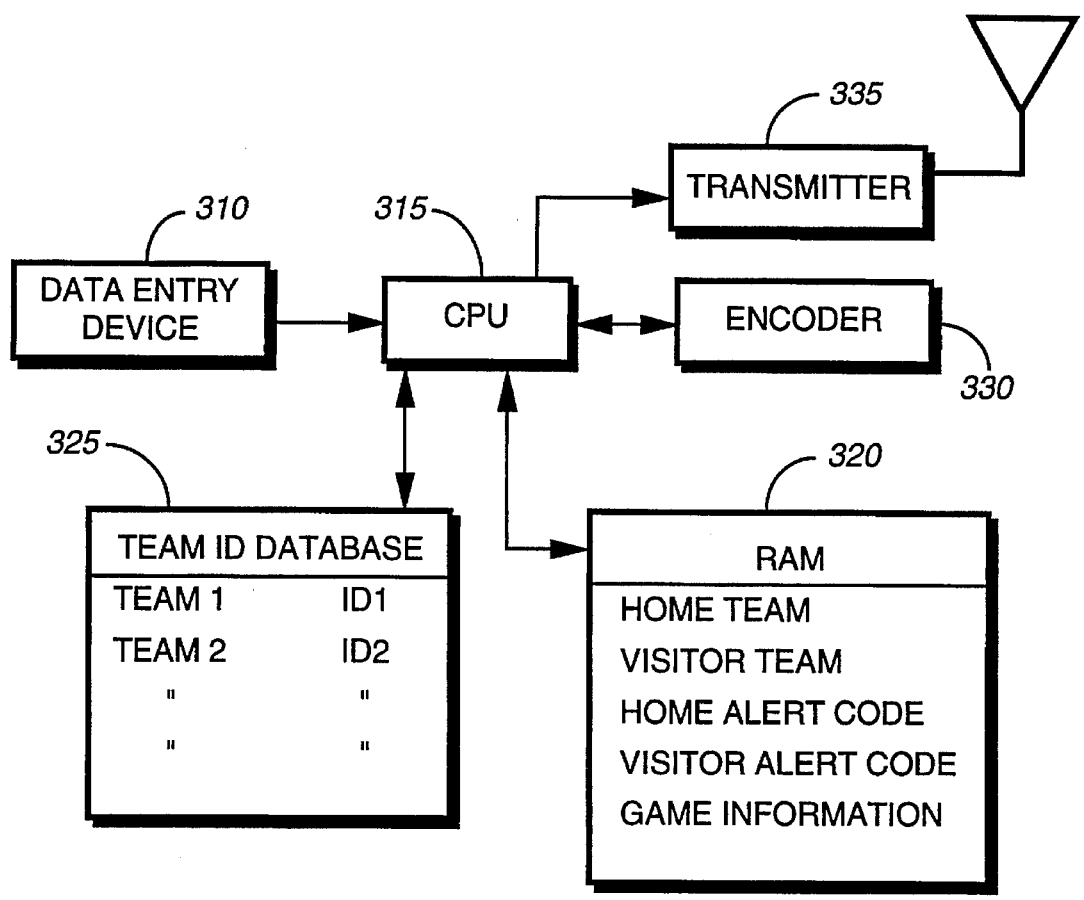
FIG. 3 is an electrical block diagram of the terminal included within the communication system of FIG. 1 in accordance with the present invention.

Referring next to FIG. 3, an electrical block diagram of the terminal 105 is depicted. The terminal 105 preferably comprises a data entry device 310, such as a keyboard, for entering the game information, the alert codes for the different teams, and information about which teams are involved in the sports event. Additionally, at the beginning of a sporting event, the data entry device 310 can be utilized to enter information indicative of which team is the home team and which team is the visitor team. The information provided by the data entry device 310 is received by a central processing unit (CPU) 315 coupled thereto for controlling the operation of the terminal 105. The CPU 315 stores the information provided by the data entry device 310 in a memory, such as a random access memory (RAM) 320. The terminal 105 further comprises a database 325 for storing a list of all of the teams and the team IDs associated therewith. The team ID can be, if sufficient space is available within the message, the name of the team. Alternatively, the team ID could be an abbreviated form of the team name or any other information by which the team can be identified.

The terminal 105 also includes an encoder 330 coupled to the CPU 315 for encoding the team IDs, the alert codes, and the game information into a message in a conventional manner. By way of example, the message could be encoded using the POCSAG (Post Office Code Standardization Advisory Group) signalling format or the GSC (Golay Sequential Code) signalling format. The encoded message is provided to a transmitter 335 for transmitting the message as a radio frequency signal.

Figure 4:
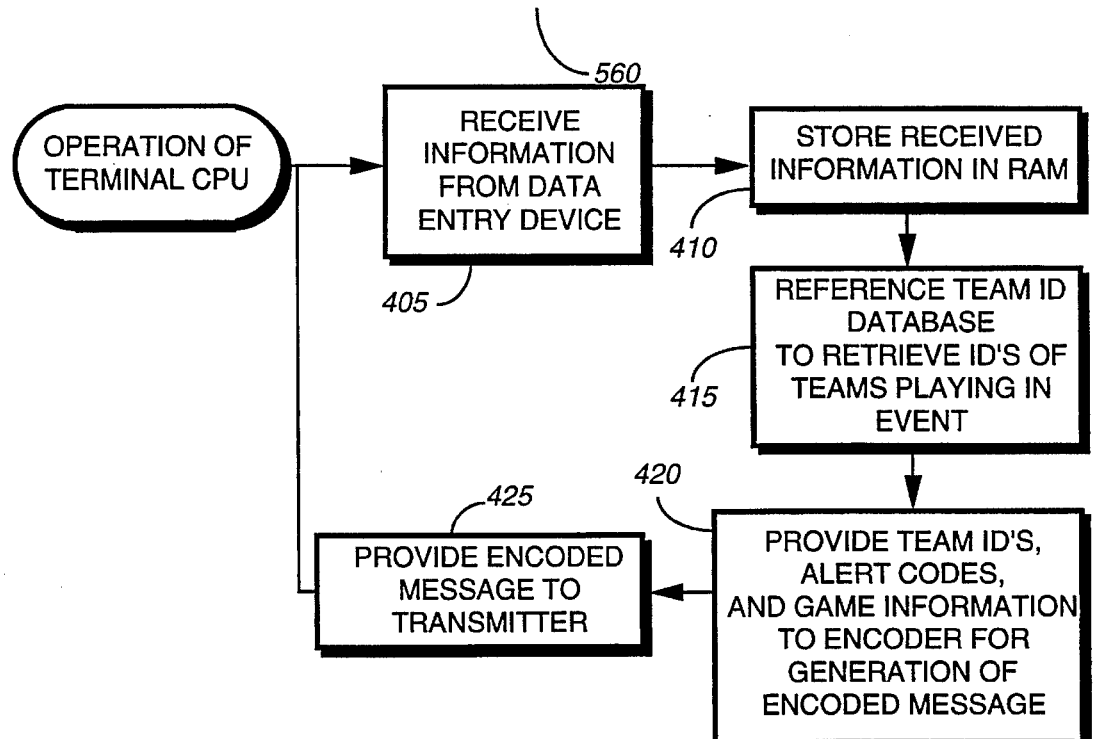
FIG. 4 is a flowchart of the operation of a processing unit included within the terminal of FIG. 3 in accordance with the present invention.

FIG. 4 is a flowchart illustrating the operation of the terminal CPU 315 in accordance with the present invention.

Preferably, the CPU 315 receives, at step 405, the information, e.g., the game information, alert codes, and visitor and home team information, from the data entry device 310 and stores, at step 410, the information in the RAM 320. Thereafter, the CPU 315 references, at step 415, the team ID database 325 to determine the team IDs for the visitor and home teams involved in the current event. The team IDs, alert codes, and game information are then, at step 420, provided to the encoder 330 for encoding into a message having the appropriate signalling format. According to the present invention, the message includes the team IDs and alert codes in the appropriate predetermined locations. By way of example, the CPU 315 can provide the visitor team ID to the encoder 330 as the first eight bits of the message when the first eight bits of the message are the predetermined location for the visitor team ID. When bits nine through sixteen are the predetermined location for the home team ID, the CPU 315 can provide the home team ID to the encoder 330 as the next eight bits of the message. This procedure is preferably also followed for placement of the visitor and home team alert codes in predetermined locations of the message. After the message is encoded, it is provided, at step 425, to the transmitter 335 for transmission to the receivers 110.

As described above, the alert codes are entered into the terminal 105 via the data entry device 310. It will be appreciated, however, that other methods for determining the alert codes to be sent to the home and visitor team receivers 110 could be utilized as well. For instance, the data entry device 310 could simply be used for entering the game information and information by which the teams are identified. A subroutine within the terminal 105 could be followed to determine how the current game information differs from previous game information and then whether the latest event in the game is favorable or unfavorable for each of the teams. If, for example, the current game information indicates that the home team has scored a run since reception of the previous game information, the terminal 105 could reference a database (not shown) to determine which alert code should be provided in that instance for the home team and which alert code should be provided for the visitor team. In this alternate embodiment of the present invention, each alert code still requires placement in a predetermined location within the message.

Figure 5:
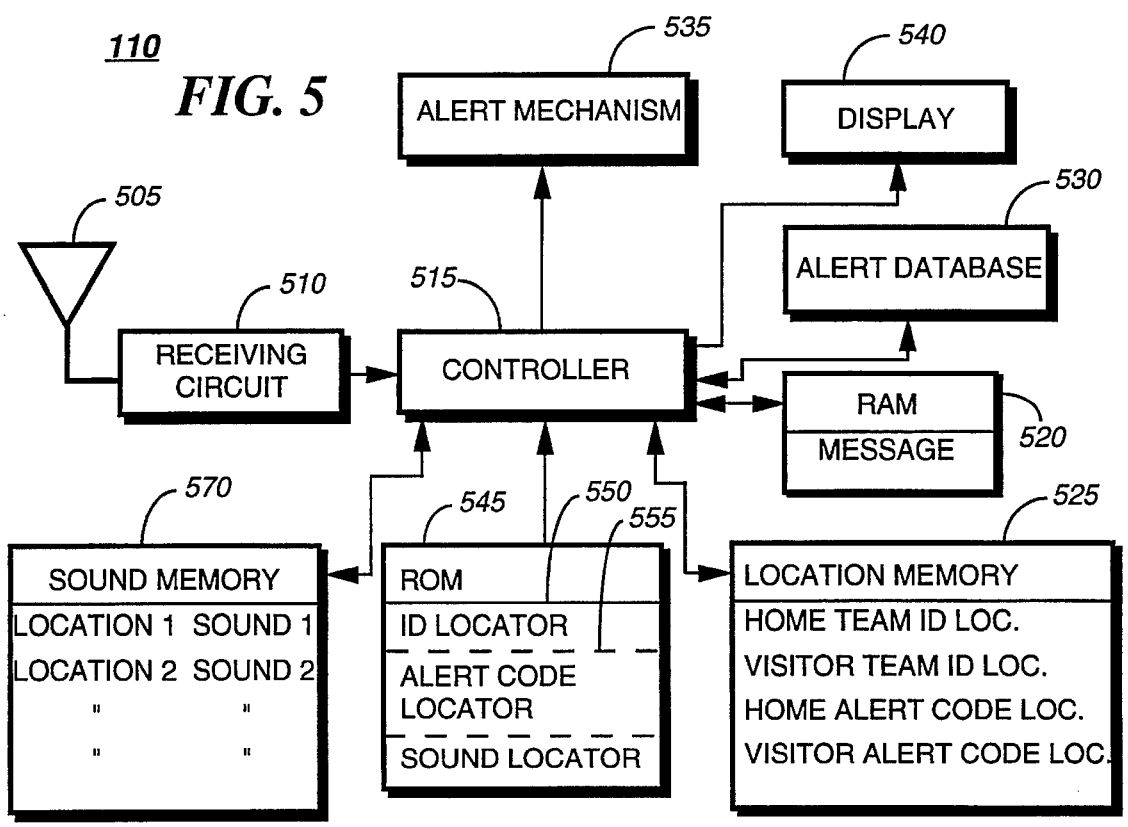
FIG. 5 is an electrical block diagram of the radio receiver included within the communication system of FIG. 1 in accordance with the present invention.

Referring next to FIG. 5, an electrical block diagram of the radio receiver 110 is shown. The radio receiver 110 preferably includes an antenna 505 for receiving a radio frequency signal transmitted by the terminal 105 (FIG. 1). A receiving circuit 510 coupled to the antenna 505 recovers the message from the radio frequency signal in a manner well known to one of ordinary skill in the art and provides the message to a controller 515, which controls the operation of the radio receiver 110. The radio receiver 110 further comprises a memory, such as a RAM 520, for storing the message and a location memory 525 for storing parameters including the predetermined locations within each message for the visitor team ID, home team ID, visitor alert code, and home alert code. An alert database 530 preferably stores a listing of alert codes that can be received in the messages transmitted by the terminal 105 and a listing of alert information corresponding thereto.

The radio receiver 110 further comprises an alert mechanism 535 for generating an alert based upon the alert information stored in the alert database 530 and a display 540 for displaying the game information included in the message to the user. A memory, such as a read only memory (ROM) 545, stores firmware elements used in processing a received message. According to the present invention, such firmware elements include an ID locator element 550 for monitoring the message to find a team ID associated with the receiver 110 and determining the location thereof within the message. An alert code locator element 555 utilizes the team ID location to locate the appropriate alert code in the message, and a sound locator element 560 looks up the alert code in the alert database 530 to find alert information used in generating an alert to be heard by the user.

The alert information can be, for example, an alert pattern used to drive the alert mechanism 535 when the alert mechanism 535 comprises a transducer. Alternatively, the alert information can comprise location information indicating where a recorded sound is located in a sound memory 570. This recorded sound can be used to drive the alert mechanism 535 when the alert mechanism 535 comprises a speaker. In some embodiments of the present invention, both a transducer and a speaker could be included to provide for the generation of a large variety of sounds and recorded messages. For instance, the recorded sounds could include messages such as "way to go!" or "oops". In embodiments that include recorded sounds, it is envisioned that such sounds could be customized by the user to provide for greater personalization of alerts.

According to the present invention, the radio receiver 110 can advantageously determine which of several alert codes within a message is an alert code intended for use by that receiver 110. Therefore, different receivers 110 can receive an identical message and select different alert codes from the identical message to generate different sounds. Air space is more efficiently utilized, as a result, because the terminal 105 can send out the same message for transmission to receivers 110 associated with both the home team and the visitor team. In prior art communication systems, on the other hand, different messages must be transmitted to each receiver 110 according to the alert code to be provided thereto. As a result, a different message would have to be provided to the home team receivers 110 than that provided to the visitor team receivers 110, and twice as many messages would have to be transmitted over the air, thereby clogging the airwaves.

Figure 6:
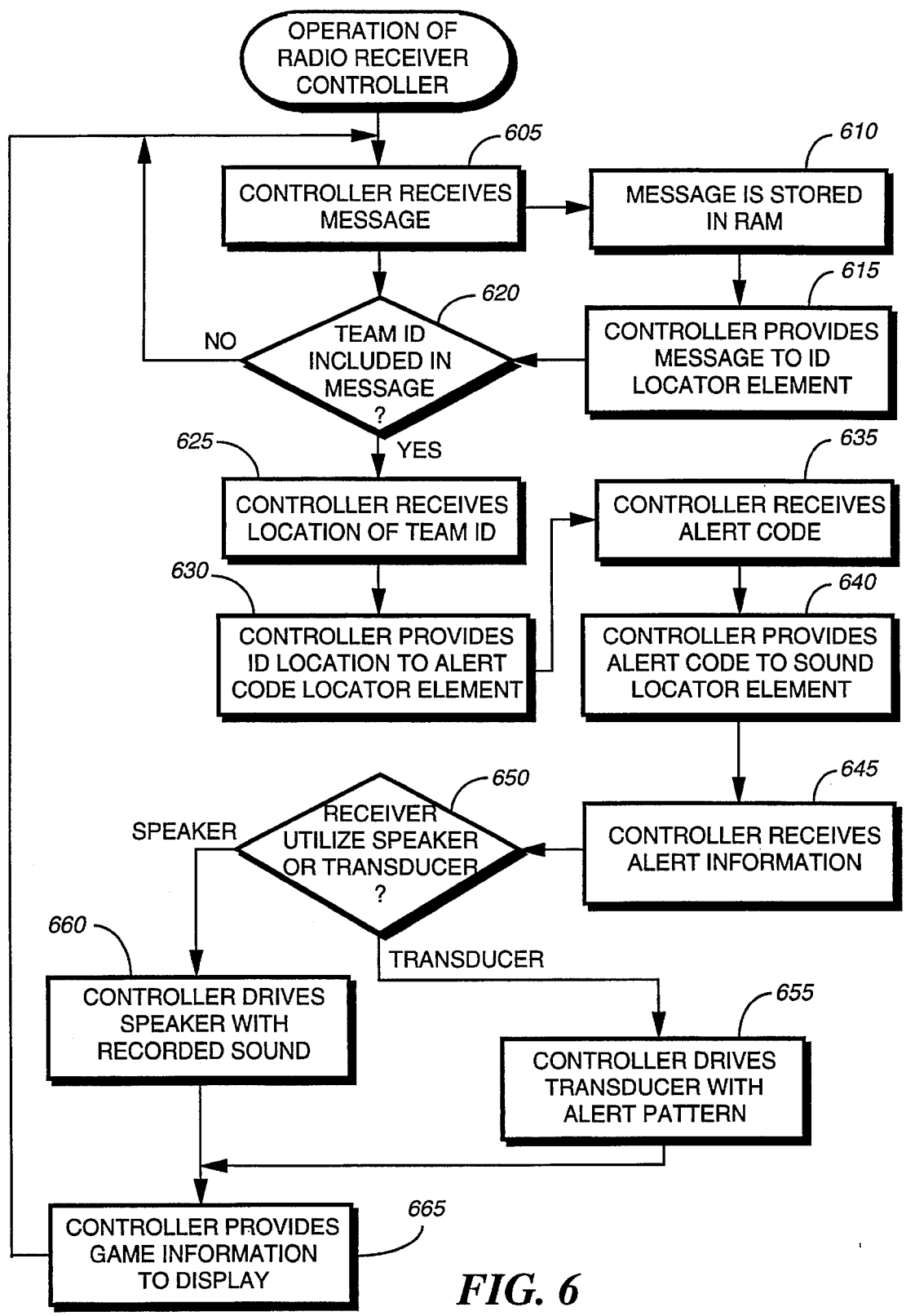
FIG. 6 is a flowchart of the operation of a controller included within the radio receiver of FIG. 5 in accordance with the present invention.

FIG. 6 is a flowchart depicting the operation of the radio receiver controller 515 (FIG. 5) in accordance with the present invention. At steps 605, 610, the controller 515 receives the message from the receiving circuit 510 and stores the message in the RAM 520. Thereafter, the controller 515 provides, at step 615, the message to the ID locator element 550. When, at step 620, the team ID associated with the receiver 110 is included within the message, the location of the ID is provided by the ID locator element 550 to the controller 515, at step 625. Next, at step 630, the ID location is provided to the alert code locator element 555, which determines which of the alert codes included in the message is the alert code to be used by the receiver 110. When, at step 635, the controller 515 receives the alert code from the alert code locator element 555, the alert code is provided, at step 640, to the sound locator element 560 for looking up alert information associated with the alert code. The alert information is received, at step 645, by the controller 515.

As mentioned above, the alert information can comprise an alert pattern or a location of a recorded sound, depending upon the type of alert mechanism 535 (FIG. 5), e.g., transducer or speaker, utilized by the receiver 110. At step 650, when the alert mechanism 535 is a transducer, the controller 515 utilizes, at step 655, the alert pattern provided by the sound locator element 560 to drive the transducer. When, at step 650, the alert mechanism 535 is a speaker, the controller 515 drives the speaker with the recorded sound located by the sound locator element 560, at step 660. Additionally, at step 665, the controller 515 provides the game information to the display 540 for presentation to the user.

Figures 7, 9:
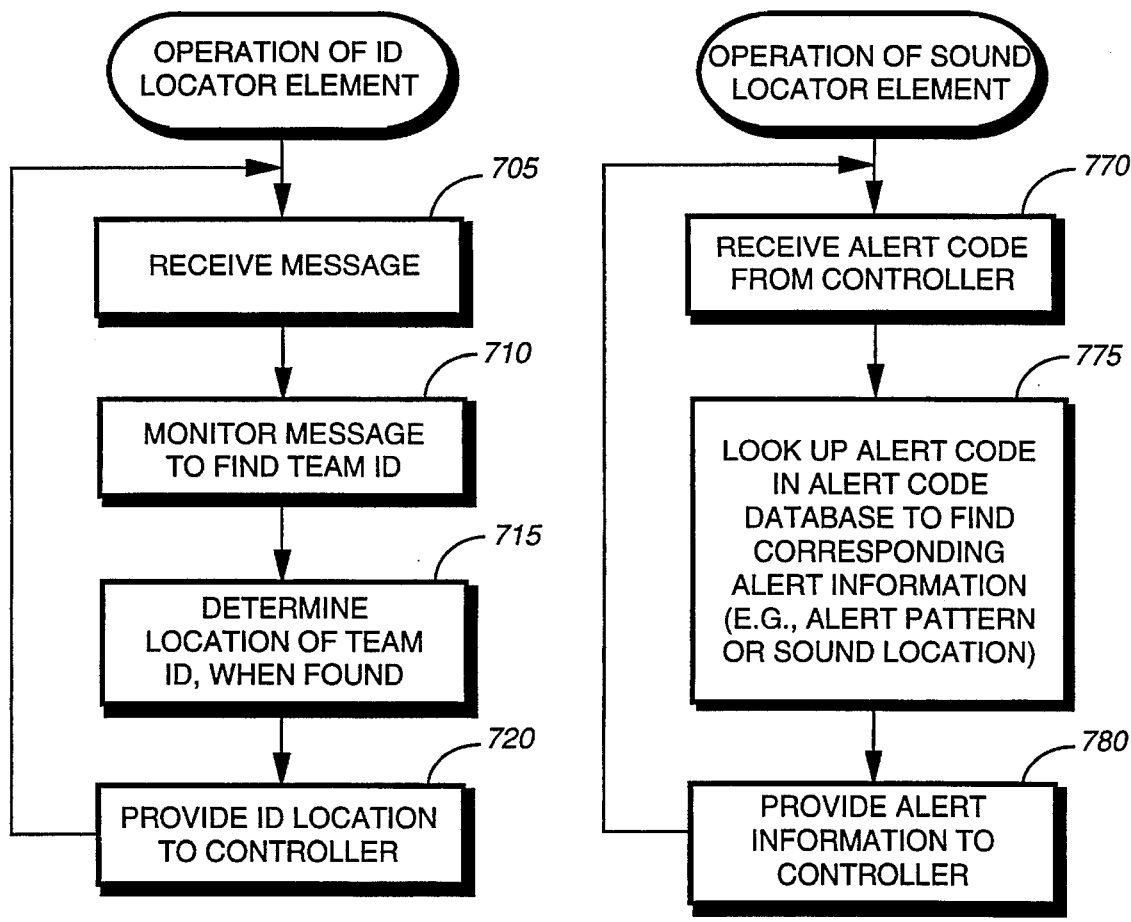
FIG. 7 is a flowchart illustrating the operation of an identification locator element included within the radio receiver of FIG. 5 in accordance with the present invention.
FIG. 9 is a flowchart of the operation of a sound locator element included within the radio receiver of FIG. 5 in accordance with the present invention.

FIG. 7 is a flowchart of the operation of the ID locator element 550 (FIG. 5) in accordance with the present invention. At step 705, the ID locator element 550 receives the message from the controller 515. Thereafter, the message is monitored, at step 710, to determine whether the team ID associated with the receiver 110 is included in the message. When the team ID is found, the location of the team ID is determined, at step 715. Next, the ID location is provided, at step 720, to the controller 515. This location can be, for example, indicated by the numbers of the message bits, e.g., bits nine through sixteen, in which the team ID is included.

Figure 8:
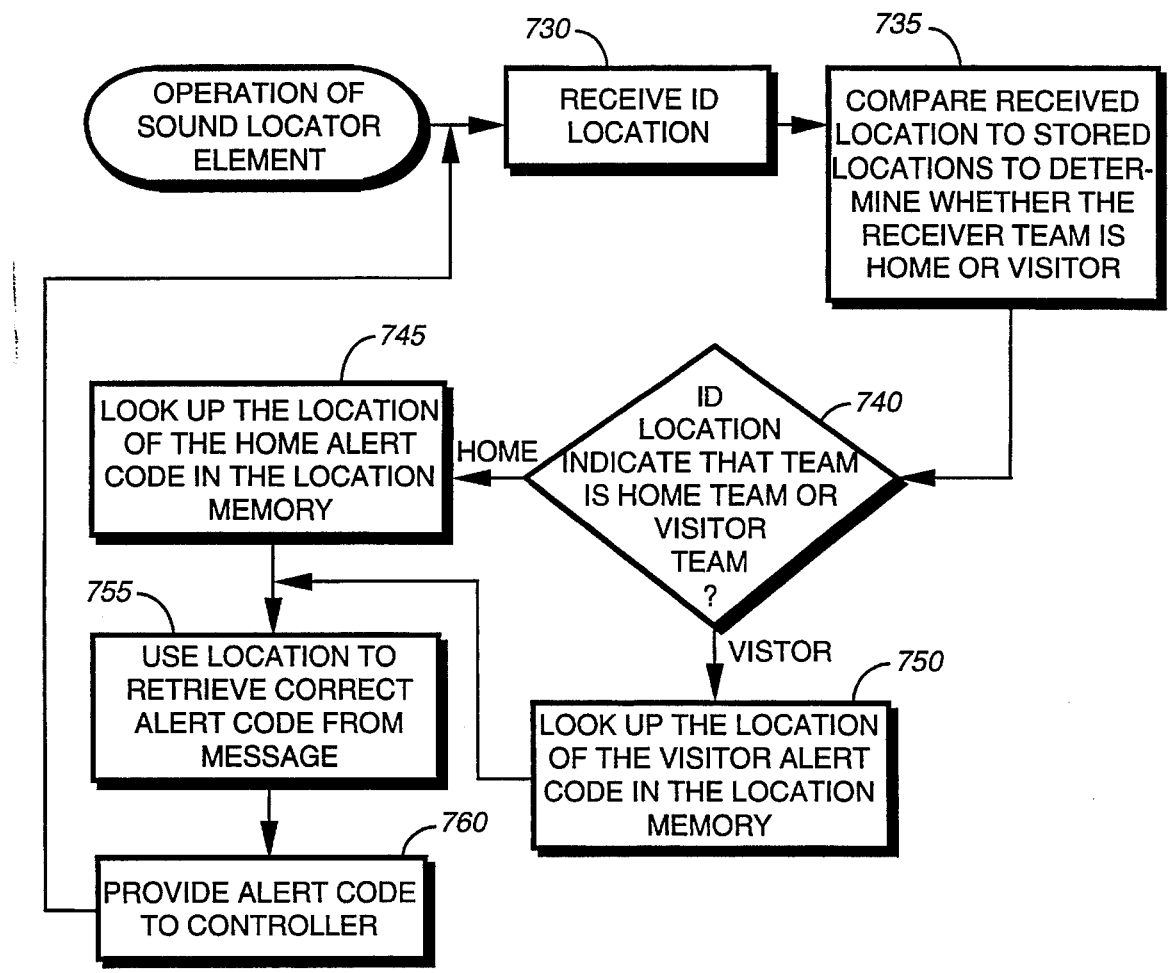
FIG. 8 is a flowchart depicting the operation of an alert code locator element included within the radio receiver of FIG. 5 in accordance with the present invention.

FIG. 8 is a flowchart of the operation of the alert code locator element 555 (FIG. 5). According to the present invention, the alert code locator element 555 receives, at step 730, the ID location from the controller 515. The alert code locator element 555 compares, at step 735, the received location to team ID locations stored in the location memory 525 to determine whether the team ID location is indicative of the home team or the visitor team. By way of example, the location memory 525 can indicate that bits nine through sixteen store the ID for the home team, in which situation the alert code locator element 555 can determine that the team associated with the receiver is currently the home team if the ID location specifies bits nine through sixteen of the message as including the team ID.

When, at step 740, the receiver 110 is associated with the home team, the location for the home team alert code is looked up, at step 745, in the location memory 525. For example, the home team alert code location could be specified as bits twenty-one through twenty-four of the message. When the receiver 110 is associated with the visitor team, the location for the visitor team alert code is determined, at step 750. Thereafter, the location indicated in the location memory 525 is utilized, at step 755, to retrieve from the message the alert code having that location in the message. When, for instance, the receiver 110 is currently associated with the home team and the home team alert code location is specified as bits twenty-one through twenty-four, the alert code locator element 555 retrieves the information included in those bits of the message to retrieve the appropriate alert code. The alert code selected from the message is provided, at step 760, to the controller 515.

Referring next to FIG. 9, the operation of the sound locator element 560 (FIG. 5) is depicted. At step 770, the sound locator element 560 receives the alert code from the controller 515. The sound locator element 560, at step 775, looks up the alert code in the alert database 530 to find the corresponding alert information. As described above, the alert information can be, for example, an alert pattern for driving a transducer or a location in which a recorded sound is stored. Next, at step 780, the sound locator element 560 provides the alert information to the controller 515.

It will be appreciated that, although the messages transmitted within the communication system 100 have been primarily described as sports messages concerning sports events, other types of messages can be transmitted as well. By way of example, the radio receiver 110 can be affiliated with a geographic area, rather than a sports team, and the unit IDs provided within the message can be associated with different geographic areas. In such a system, the messages can further include traffic information or other information pertinent to the areas along with alert codes that are content-specific for different unit IDs included within the message. To reiterate, other embodiments of the present invention are envisioned in which the messages transmitted to the radio receivers 110 include unit IDs specific to a group of receivers 110, alert codes intended for use by the different groups as specified by the unit IDs, and message information, the content of which is determinative of the alert codes provided within the messages.

In summary, the communication system as described above includes a terminal for transmitting identifications (IDs) for both home and visitor teams in predetermined locations within a message. Additionally, the terminal transmits an alert code for use by receivers associated with the home team and an alert code for use by receivers associated with the visitor team, each in a predetermined location. A receiver included in the communication system receives the message and, when one of the recipient IDs is equivalent to a team ID associated with the receiver, determines the location of the recipient ID in the message. This location is, in accordance with the present invention, utilized by the receiver to look up a location in which one of the alert codes is located.

In this manner, the receiver can advantageously choose the correct alert code for generating an alert from two or more transmitted alert codes included in the same message. As a result, the same message can be provided to receivers associated with opposing teams, and the receivers can, after selection of the appropriate alert code, generate different alerts indicating to the user whether his team has performed favorably or unfavorably. Therefore, the airwaves are utilized efficiently because, according to the present invention, a single message is provided to inform all users interested in a sports event of updates to the event. In conventional communication systems, on the other hand, receivers are unable to determine from message content which of several alerts should be generated. As a result, in conventional systems, a different message would have to be sent to fans of one team than that sent to fans of the opposing team in order to indicate different alerts for receivers carried by the different fans. Sending two messages would increase not only the time in which messages could be transmitted, but also less efficiently utilize the airwaves over which the messages are transmitted.

It will be appreciated by now that there has been provided a method and apparatus for generating alerts based upon message content.

What is claimed is:

1. A method, in a radio receiver, for generating alerts based upon message content, the method comprising the steps of:

receiving a common message comprising at least first and second recipient identifications (IDs) and at least first and second alert codes, wherein the common message is received by other system receivers having addresses equivalent to an address associated with the radio receiver, and wherein the at least first and second recipient IDs and the at least first and second alert codes are separate and distinct from the address:

determining which of the at least first and second recipient IDs included in the common message is a recipient ID associated with the radio receiver;

selecting one of the at least first and second alert codes indicated by the recipient ID associated with the radio receiver, wherein the one of the at least first and second alert codes selected by the radio receiver can be different from an alert code, included in the at least first and second alert codes, that is selected by others of the other system receivers; and generating an alert associated with the one of the at least first and second alert codes.

2. The method of claim 1, wherein the at least first and second recipient IDs are located in a first set of predetermined locations within the common message, and wherein the selecting step comprises the steps of:

determining a first predetermined location included within the first set of predetermined locations of the common message in which the recipient ID associated with the radio receiver is located; and utilizing the first predetermined location to look up a second predetermined location included within a second set of predetermined locations included in the common message, wherein the one of the at least first and second alert codes is located in the second predetermined location.

3. The method of claim 1, further comprising the step of:

utilizing the one of the at least first and second alert codes provided in the common message to locate an alert pattern.

4. The method of claim 3, wherein the generating step comprises the step of:

driving a transducer with the alert pattern to generate the alert.

5. The method of claim 1, further comprising the step of:

utilizing the one of the at least first and second alert codes provided in the common message to locate a recorded sound.

6. The method of claim 5, wherein the generating step comprises the step of:

driving a speaker with the recorded sound to generate the alert.

7. The method of claim 1, wherein the radio receiver and the other system receivers are associated with one of opposing sports teams, the common message includes information about a sports event in which the opposing sports teams are participating, the at least first and second alert codes are associated with positive and negative alerts, and the generating step comprises the step of:

generating the positive alert when the recipient ID associated with the radio receiver indicates that the information included in the common message is favorable to the sports team with which the radio receiver is associated.

8. A method for generating alerts based on message content in a communication system comprising a terminal which transmits messages to system receivers all having a common address with which the messages are associated, the method comprising the steps of:

the terminal transmitting the common address along with a common message to the system receivers that are all associated with the common address, the common message comprising at least first and second recipient identifications (IDs) and at least first and second alert codes, each associated with one of the at least first and second recipient IDs, wherein the at least first and second recipient IDs and the at least first and second alert codes are separate and distinct from the common address;

a first radio receiver included in the system receivers receiving the common message and determining which of the at least first and second recipient IDs is a recipient ID associated with the first radio receiver;

the first radio receiver selecting the first alert code as that indicated by the recipient ID associated with the first radio receiver;

the first radio receiver generating an alert associated with the first alert code provided in the common message:

a second radio receiver included in the system receivers receiving the common message and determining which of the at least first and second recipient IDs is a recipient ID associated with the second radio receiver;

the second radio receiver selecting the second alert code as that indicated by the recipient ID associated with the second radio receiver; and the second radio receiver generating an alert associated with the second alert code provided in the common message.

9. The method of claim 8, wherein the at least first and second recipient IDs are located in a first set of predetermined locations within the common message, and wherein the selecting step comprises, in the first radio receiver, the steps of:

determining a first predetermined location included within the first set of predetermined locations in which the recipient ID associated with the first radio receiver is located; and utilizing the first predetermined location to look up a second predetermined location included within a second set of predetermined locations, wherein the the first alert code is located in the second predetermined location.

10. The method of claim 8, wherein the generating step comprises, in the first radio receiver, the steps of:

utilizing the first alert code to locate an alert pattern; and driving a transducer with the alert pattern to generate the alert.

11. The method of claim 8, wherein the generating step comprises, in the first radio receiver, the steps of:

utilizing the first alert code provided in the common message to locate a recorded sound; and driving a speaker with the recorded sound to generate the alert.

12. The method of claim 8, wherein the first and second radio receivers are associated, respectively, with first and second teams participating in a sports event, the common message includes information about the sports event, the first and second alert codes are associated, respectively, with positive and negative alerts, and wherein:

in the first radio receiver, the generating step comprises the step of generating the positive alert associated with the first alert code to indicate that the information included in the common message is favorable to the first team associated with the first radio receiver; and in the second radio receiver, the generating step comprises the step of generating the negative alert associated with the second alert code to indicate that the information included in the common message is not favorable to the second team associated with the second radio receiver.

13. A radio receiver for generating alerts based upon content of received messages, the radio receiver comprising:

a receiving circuit for receiving an address and a message common to all system receivers, the address indicating that the message is intended for reception by the system receivers, the message comprising at least first and second alert codes that are separate and distinct from the address and that are each indicative of an alert pattern, the message further comprising at least first and second recipient identifications (IDs) that are separate and distinct from the address and that direct each of the system receivers to one of the at least first and second alert codes within the message;

an ID locator element coupled to the receiving circuit for monitoring, after determining from the address that the message is intended for reception by the radio receiver the message to determine whether an ID associated with the radio receiver is equivalent to one of the at least first and second recipient IDs and, when the ID associated with the radio receiver is equivalent to one of the at least first and second recipient IDs, for determining a location of the one of the at least first and second recipient IDs within the message;

an alert code locator element coupled to the ID locator element for utilizing the location of the one of the at least first and second recipient IDs to look up a location associated with one of the at least first and second alert codes provided in the message; and a sound locator element coupled to the alert code locator element for utilizing the one of the at least first and second alert codes to look up alert information associated therewith.

14. The radio receiver of claim 13, further comprising:

an alert mechanism for generating an alert based upon the alert information looked up by the sound locator element.

15. The radio receiver of claim 14, wherein the alert mechanism comprises a transducer and the alert information comprises an alert pattern applied to the transducer to generate the alert.

16. The radio receiver of claim 14, wherein the alert mechanism comprises a speaker and the alert information comprises location information specifying a location in which a recorded sound is stored, wherein the recorded sound is utilized to drive the speaker to generate the alert.

17. The radio receiver of claim 13, wherein the radio receiver is associated with a team participating in a sports event, the information common to the system receivers is about the sports event, the one of the at least first and second alert codes selected by the radio receiver is indicative of positive alert information when the information is favorable to the team, and the one of the at least first an second alert codes selected by the radio receiver is indicative of negative alert information when the information is not favorable to the team.

18. A communication system for alerting a user of message content, the communication system comprising:

a terminal for generating and transmitting an address common to all system receivers and a message associated with the address and intended for reception by the system receivers, the message comprising at least first and second alert codes that are separate and distinct from the address and that are each indicative of an alert pattern, the message further comprising at least first and second recipient identifications (IDs) that are separate and distinct from the address and that direct each of the system receivers to one of the at least first and second alert codes within the message;

a radio receiver for receiving the address and the message, for determining from the address that the message is intended for reception by the radio receiver, for determining that the first recipient ID is equivalent to an ID associated with the radio receiver, for selecting one of the at least first and second alert codes based upon a location of the first recipient ID within the message, and for generating an alert associated with the one of the at least first and second alert codes.

19. The communication system of claim 18, wherein the radio receiver comprises:

a receiving circuit for receiving the address and the message;

a controller coupled to the receiving circuit for determining, from the address, that the message is intended for reception by the radio receiver;

an ID locator element coupled to the receiving circuit for monitoring the message to determine whether the ID associated with the radio receiver is equivalent to the first recipient ID and for determining, when the ID associated with the radio receiver is equivalent to the first recipient ID, the location of the first recipient ID within the message;

an alert code locator element coupled to the ID locator element for utilizing the location of the first recipient ID to look up a location associated with the one of the at least first and second alert codes; and a sound locator element coupled to the alert code locator element for utilizing the one of the at least first and second alert codes to look up alert information associated therewith, wherein the alert information is utilized by the radio receiver to generate the alert.

20. The communication system of claim 19, wherein the radio receiver further comprises a transducer, and wherein the alert information comprises an alert pattern applied to the transducer to generated the alert.

21. The communication system of claim 19, wherein the radio receiver further comprises a speaker, and wherein the alert information comprises a location in which is stored a recorded sound for driving the speaker.

22. The communication system of claim 18, wherein the terminal further comprises:

a data entry device for providing the terminal with the at least first and second alert codes to be included in the message and information indicative of the at least first and second recipient IDs to be included in the message;

an encoder coupled to the data entry device for encoding the at least first and second recipient IDs and the at least first and second alert codes into the message in locations that are separate and distinct from the address associated with the message; and a transmitter coupled to the encoder for transmitting the address and the message.

23. The communication system of claim 22, wherein the terminal further comprises:

a database for storing a plurality of recipient IDs; and a controller coupled to the database, the data entry device, and the encoder for using the information provided by the data entry device to look up the at least first and second recipient IDs for transmission to the encoder.

24. The communication system of claim 18, wherein the system receivers are associated with teams participating in a sports event, the message includes information about the sports event, the recipient IDs indicate to the radio receiver whether a team associated therewith is playing in the sports event, and the at least first and second alert codes are indicative, respectively, of a positive alert for presentation when the information is favorable to the team and a negative alert for presentation when the information is not favorable to the team.

* * * * *